UNITED STATES PATENT OFFICE.

GEORGE D. VAN ARSDALE, OF EAST ORANGE, NEW JERSEY.

METHOD OF EXTRACTING COPPER FROM ORES.

1,119,477.     Specification of Letters Patent.     Patented Dec. 1, 1914.

No Drawing.     Application filed May 16, 1912. Serial No. 697,784.

*To all whom it may concern:*

Be it known that I, GEORGE D. VAN ARSDALE, a citizen of the United States, and a resident of East Orange, county of Essex, and State of New Jersey, have invented certain new and useful Improvements in Methods of Extracting Copper from Ores, of which the following is a specification.

My invention relates to an improvement in a method of leaching copper ores and separating metallic copper from the resulting solution by electrolysis. The solution preferably used is one containing copper in the form of sulfate, together with other sulfates which will be obtained by leaching copper ore containing iron by the use of diluted sulfuric acid.

Heretofore sulfur dioxid has been added to such solutions before electrolyzing for the purpose of reducing polarization, and similar methods using chlorid solutions have been proposed. None of these methods has been commercially successful and I have discovered that under the conditions present in employing them a part or all of the copper is precipitated as sulfid compounds of copper and not as metallic copper. This disadvantageous feature is caused by electrolytic hydrogen evolved at the cathode reacting with the sulfur dioxid present and forming hydrogen sulfid which then precipitates copper as sulfid. This side reaction is extremely undesirable as sulfid of copper is not marketable as such and requires further expensive treatment before it can be sold. I have discovered that such deposition of sulfid copper compounds can be prevented and will describe herein my novel method of leaching copper ores and separating metallic copper from the solution obtained.

I prefer to use a solution of copper sulfate. This may be made either by dissolving the requisite amount of copper sulfate in water or by making a solution of copper sulfate from copper ores which have been roasted. Such solutions contain certain amounts of ferrous sulfates which in former practice has been undesirable, but which according to my improved method is made a desirable factor. The next step is to add in any of the well known ways, sulfur dioxid, and the resulting solution is treated electrolytically. A function of the sulfur dioxid is not only to act as a depolarizer but also to reduce any ferric sulfate present in the solutions to ferrous salts which also tend to prevent polarization at the anode, the ferrous sulfate combining with nascent oxygen at the anode to form ferric sulfate. The precipitation of sulfid of copper might be avoided by using an electrolytic cell which is divided by a porous diaphragm into two compartments and not allowing sulfur dioxid to be present in the cathode compartment. But I prefer to work without a diaphragm and to regulate the voltage and speed of deposition so that copper only is separated and not hydrogen or sulfid of hydrogen. With a 10% solution of copper sulfate containing sulfur dioxid sufficient to prevent polarization and to reduce all salts of iron to the ferrous state, I find that with about ten amperes per square foot in voltage between .7 and 1.2 volts it is possible to precipitate about 80% of the copper before the formation of the sulfids commences and I prefer therefore to stop at that point. The solution after precipitating 80% of the copper will then contain free sulfuric acid and the remaining copper and is used for leaching copper from more ores. In doing this the leaching is so carried on as to approximately regenerate the original solution which is then again subjected to the same operations as before.

The voltages and amperage specified are given as an example of a given case, but may be varied under differing conditions; but what I have discovered and believe to be new is, that it is possible by proper control of the conditions to precipitate copper only and to avoid the undesirable and disadvantageous precipitation of sulfids which side-reaction although not described or mentioned in prior patents and publications on this subject, is present in past methods to such an extent as to prohibit their commercial adoption.

It is to be understood that the foregoing description is general and that details may vary considerably in different cases. Other methods and conditions necessary to avoid the sulfid precipitation and for other reasons may be required and possible. For example, the electrolyte may be heated and circulated during the electrolytic treatment.

What I claim is:

1. The herein described method of extracting copper from ores which comprises leaching the ores with a solution containing sulfuric acid, adding sulfur dioxid to the resulting solution, electrolyzing said solution, and controlling the electrical conditions to cause the deposition of the copper either in the form of metallic copper or copper sulfid.

2. The herein described method of extracting copper from ores, which comprises leaching the ores with a solution containing sulfuric acid, adding sulfur dioxid to the resulting solution, electrolyzing said solution, controlling the electrical conditions to cause the deposition of a large portion of the copper in the form of metallic copper, and stopping the electrolysis before sulfid compounds begin to be precipitated.

3. The herein described method of extracting copper from ores which comprises leaching the ores with a solution containing sulfuric acid and sulfates to form a copper sulfate solution containing substantially ten per cent. copper, adding sulfur dioxid to such solution to prevent polarization, electrolyzing said solution, controlling the electrical conditions to permit the deposition of the metallic copper, and stopping the electrolysis when approximately eighty per cent. of the copper has been removed and before sulfid compounds begin to be precipitated.

4. The herein described method of extracting copper from ores which comprises leaching the ores with a solution containing sulfuric acid and sulfates, adding sulfur dioxid to the resulting solution, electrolyzing said solution, controlling the electrical conditions to cause the deposition of a large portion of the copper in the form of metallic copper, stopping the electrolysis before sulfid compounds begin to be precipitated, whereby the resulting acid solution is substantially the same in composition as the original solution, and using said resulting acid solution to leach additional ore.

In witness whereof, I have hereunto set my hand this 15th day of May 1912.

GEORGE D. VAN ARSDALE.

Witnesses:
WILLIAM J. SPERL,
ERNEST W. MARSHALL.

Copies of this patent may be obtained for five cents each, by addressing the "Commissioner of Patents, Washington, D. C."